UNITED STATES PATENT OFFICE.

CARL MÜLLER, OF LUDWIGSHAFEN, GERMANY, ASSIGNOR TO THE BADISCHE ANILIN AND SODA-FABRIK, OF SAME PLACE.

VIOLET DYE.

SPECIFICATION forming part of Letters Patent No. 501,434, dated July 11, 1893.

Application filed April 16, 1892. Serial No. 429,466. (Specimens.) Patented in France July 1, 1891, No. 214,571.

*To all whom it may concern:*

Be it known that I, CARL MÜLLER, doctor of philosophy, a subject of the King of Bavaria, residing at Ludwigshafen-on-Rhine, in the Kingdom of Bavaria and Empire of Germany, have invented new and useful Improvements in the Manufacture of Coloring-Matters, (for which I have obtained a patent in France, No. 214,571, dated July 1, 1891,) of which the following is a specification.

This invention relates to the manufacture of a new violet dyestuff.

In the preparation of this new dye, I first combine resorcinol with either para or ortho-toluidine or meta-xylidine and thus obtain as is known meta-hydroxy-phenyl-para-tolylamine, meta-hydroxy-phenyl-ortho-tolylamine, or meta-hydroxy-phenyl-meta-xylylamine, respectively. These bodies may of course be prepared in any other way. Now I have discovered that these compounds can be alkylated to yield new ethers; these new ethers can be condensed with tetra-alkyl-diamido-benzo-phenone to yield new basic coloring matters, and these basic coloring matters on sulphonation are converted into my new dye.

To illustrate the nature of the invention and the manner in which it can be carried into practical effect I give directions for (first) the production of an alkyl-ether of meta-hydroxy-phenyl-para-tolylamine; (second) the condensation of this body with a tetra-alkyl-diamido-benzo-phenone to produce a violet basic coloring matter; (third) the conversion of this basic coloring matter by sulphonation into my new dyestuff.

*Example 1. Preparation of an alkyl-ether of meta-hydroxy-phenyl-para-tolylamine.*—Mix together about one hundred (100) parts of meta-hydroxy-phenyl-para-tolylamine, about twenty (20) parts of solid caustic soda, about four hundred (400) parts of methyl alcohol and about forty (40) parts of methyl-chloride and heat the mixture in an autoclave or vessel capable of withstanding pressure for about twenty-four (24) hours at a temperature of about one hundred and fifteen to one hundred and twenty degrees centigrade (115° to 120° c.). Distill off the methyl alcohol from the resulting product and wash the residue first with dilute caustic soda solution, then with water and finally free the product from water by drying at a temperature of about one hundred degrees centigrade (100° c.). In this way the desired ether is obtained in a condition sufficiently pure for use in the manufacture of dyestuffs; it is a thick oil which can be distilled at a temperature of about three hundred and sixty degrees centigrade (360° c.) and which on standing for a long time solidifies to a weakly colored crystalline mass. This can be recrystallized from benzine and then has a melting point of about sixty-eight degrees centigrade (68° c.).

*Example 2. The production of a violet blue basic dyestuff by the condensation of a tetra-alkyl-diamido-benzo-phenone with an alkyl-ether of meta-hydroxy-phenyl-para-tolylamine.*—Mix about twenty-two (22) parts of meta-methoxy-phenyl-para-tolylamine (obtained as described in Example 1 or in any other way) and about twenty-seven (27) parts of tetra-methyl-diamido-benzo-phenone with about thirty-five (35) parts of phosphorous oxychloride and about eight (8) parts of toluene (which acts as a diluent) and heat the mixture on the water bath in a vessel provided with a stirrer. Heat the water bath to boiling and stir the mixture for half an hour ($\frac{1}{2}$h.) at this temperature. The melt which assumes a metallic sheen, is poured in small portions at a time into a solution of common salt and boiled with this, and is then extracted with toluene or heavy oil. The residual coloring matter is then dried at a temperature of about sixty (60°) degrees centigrade and finally reduced to powder. The coloring matter thus obtained is a dark powder with a metallic sheen slightly soluble in water, more easily soluble in alcohol.

Instead of using phosphorous oxychloride in the above example other condensing agents can be used such as phosgene and similar halogen compounds.

*Example 3. Preparation of my new dyestuff.*—Fuming sulphuric acid is preferably used for sulphonating the basic coloring matter obtained as above described, but equivalent compounds can be used. The temperature of the sulphonation must be varied according to the strength of the acid used. The following method has hitherto given the best results: Grind together about thirty (30) parts of the basic coloring matter obtained as above described in Example 2, and an equal quantity of anhydrous sodium sulphate and slowly add this mixture to about one hundred and fifty parts (150) of fuming sulphuric acid containing about twenty-four per cent of free sulphuric anhydride (24 % of $SO_3$). The ac'd must be well cooled and during the addition the temperature should be kept below about ten degrees centigrade (10° c.). Continue stirring for a few hours until a sample is completely soluble in alkali. Then pour the whole into ice water and add sufficient caustic soda to nearly neutralize the solution. Precipitate the dyestuff with sodium sulphate, filter and dry.

Throughout this specification by parts are meant parts by weight.

By the term "alkyl" in the above description I mean both methyl and ethyl, and in all the steps of the process where methyl compounds are mentioned, the equivalent quantity of the corresponding ethyl-derivative can be used. Also although I have only mentioned the derivatives of phenyl-para-tolylamine in the examples, still this is only done for the sake of clearness and the equivalent quantities of the analogous derivatives of phenyl-ortho-tolylamine and phenyl-meta-xylylamine (starting respectively from the meta-hydroxy-phenyl-ortho-tolylamine or the meta-hydroxy-meta-xylylamine herein before described) can be used throughout and my new dyestuff obtained. Similarly, where in the examples tetra-methyl-diamido-benzophenone is mentioned tetra-ethyl-diamido-benzo-phenone can be used.

My new product is a beautiful violet blue dyestuff for animal fiber. Dyed on wool from the acid bath it yields beautiful shades which are characterized by a valuable degree of fastness to washing.

Chemically my new dyestuff whether prepared by using methyl or ethyl compounds, whether employing tolylamine or xylylamine derivatives, can, neglecting the sulpho-group, be represented by the following formula:

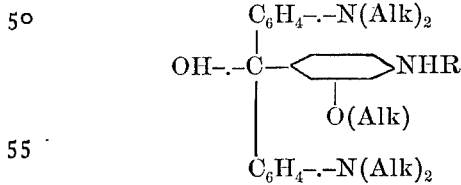

In this formula Alk stands either for ethyl or methyl and R for either tolyl or xylyl.

In all its forms my new dyestuff is a sulphonated derivative of ortho-alkyloxy-pararosaniline. It can be recognized by the following characteristic properties: It is a dark colored powder soluble in water and alcohol giving beautiful violet blue solutions; it is insoluble in ether and benzene. If ammonia be added to the aqueous solution an almost colorless solution is obtained. Its reactions with hydrochloric and sulphuric acid are more particularly characteristic; if hydrochloric acid be gradually added to the aqueous solution, its color turns reddish violet and finally a dull violet red; if the dry dyestuff be dissolved in concentrated sulphuric acid, an orange brown solution is obtained which on gradual dilution with water changes through violet red and violet to blue.

It will be observed that, as the dyestuff covered by this patent, I include a class of coloring matters which, however, appear to be so nearly alike that they may be practically regarded as substantially the same dyestuff. This class is distinguished generically from known acid violet dyestuffs, because it contains an alkyl-oxy-group.

I may add that my new dyestuff derives its commercial value largely from its equalizing power.

What I claim as new, and desire to secure by Letters Patent, is—

1. The new violet dyestuff, which is a sulphonated derivative of ortho-alkyl-oxy-pararosaniline, soluble in water and in alcohol, insoluble in ether and benzene, giving a violet blue aqueous solution turning violet red on treatment with hydrochloric acid and dissolving in concentrated sulphuric acid, giving an orange brown solution which changes through violet red to blue on dilution with water, all substantially as described.

2. The process for the production of a violet dyestuff which process consists in exposing the alkyl-ethers of meta-hydroxy-phenyl-para-tolylamine, meta-hydroxy-phenyl-ortho-tolylamine or meta-hydroxy-phenyl-meta-xylylamine to the action of a condensing agent such as phosphorous oxychloride or phosgene in the presence of a diluent such as toluene and then sulphonating the basic coloring matter formed substantially as described.

In testimony whereof I have hereunto set my hand in the presence of two subscribing witnesses.

CARL MÜLLER.

Witnesses:
ERNEST G. EHRHARDT,
CARL KLOTZ.